United States Patent [19]

Bakewell

[11] Patent Number: 4,636,811

[45] Date of Patent: Jan. 13, 1987

[54] THERMAL PRINT HEAD

[75] Inventor: Joseph J. Bakewell, Boxford, Mass.

[73] Assignee: Dynamics Research Corporation, Wilmington, Mass.

[21] Appl. No.: 790,828

[22] Filed: Oct. 24, 1985

[51] Int. Cl.⁴ .............................................. G01D 15/10

[52] U.S. Cl. ................................ 346/76 PH; 219/543; 338/306; 400/120

[58] Field of Search ................... 346/76 PH; 219/543, 219/216 PH; 338/306; 400/120

[56] References Cited

U.S. PATENT DOCUMENTS 4,399,348 8/1983 Bakewell ........................ 346/76 PH 4,415,403 11/1983 Bakewell ........................ 346/76 PH

OTHER PUBLICATIONS

"Universal Printhead" by Kuntzleman et al, IBM Tech. Disclosure Bulletin, vol. 25, No. 4, Sept. 1984, pp. 2117-2119.

*Primary Examiner*—Arthur G. Evans

*Attorney, Agent, or Firm*—Weingarten, Schurgin Gagnebin & Hayes

[57] ABSTRACT

A thermal print head comprising a laminated structure having a dielectric sheet containing a plurality of electrodes having ends terminating along a common edge, and a conductive ground sheet disposed on the opposite side of the dielectric sheet from the electrodes and also terminating at the common edge. A resistive material is provided along the common edge in contact with the ground plane and electrodes. When power is applied to a selected electrode, a conductive path is established from the electrode through a portion of the resistive material and into the ground plane to complete an electrical circuit for heating the activated portion of resistive material which serves as a printing element for marking of thermal paper confronting the common edge of the print head. In an alternative embodiment, multiple rows of electrode ends can be grouped opposite to respective ground planes and can be energized in a multiplex addressing mode.

6 Claims, 3 Drawing Figures

THERMAL PRINT HEAD

FIELD OF THE INVENTION

This invention relates to thermal printing and more particularly to a thermal print head and method of fabricating such a print head.

BACKGROUND OF THE INVENTION

Thermal print heads are known for dot matrix printing on a writing surface. In general thermal print heads comprise an array of resistive elements disposed in one or more rows along the length of the writing surface of the head and electrodes coupled from each resistive element to contact pads by which electrical power from a suitable source is applied for selective energization of the resistive elements which are operative to form spots on the writing surface in a pattern as the writing surface moves relative to the print head to form intended letters, numerals or other characters.

Thermal print heads have been constructed by a variety of techniques which vary in complexity in accordance with the precision and resolution of the head structure. In general the more precise higher resolution heads are of more complex and more expensive construction than heads providing lesser performance.

SUMMARY OF THE INVENTION

A thermal print head is disclosed which is economically manufactured by laminating a dielectric sheet and a conductive ground sheet together into a sandwiched structure. A second dielectric sheet can be laminated on the opposite side of the conductive ground sheet to provide higher resolution printing as described below. The sheets have a common edge which serves as the print head surface. Electrodes are carried on the outside planar surfaces of the dielectric sheets with ends coplanar with the print head surface. Resistive material is placed on the print head surface in electrical contact with the electrode ends and the ground plane edge. When power is applied to a selected electrode, a conductive path is established from the electrode end, through a portion of the resistive material and into the ground plane. The electrically activated portion of resistive material serves as a printing element, which heats sufficiently to mark the thermal paper. The electrode ends are disposed in two laterally offset rows, thereby producing an array of printing elements capable of higher resolution printing on the thermal paper than would otherwise be possible with a single row of printing elements.

In an alternative embodiment, multiple rows of electrode ends are grouped opposite a ground plane which is divided into segments. The members of each electrode group are electrically connected to a single contact area, and respective members of a group are positioned with ends opposite respective ground segments. Such an arrangement allows for a simple electrical configuration in a multiple addressing head.

DESCRIPTION OF THE DRAWINGS

The invention will be more fully understood from the following detailed description taken in conjunction with the accompanying drawings in which.

DETAILED DESCRIPTION OF THE INVENTION

Figure 1:
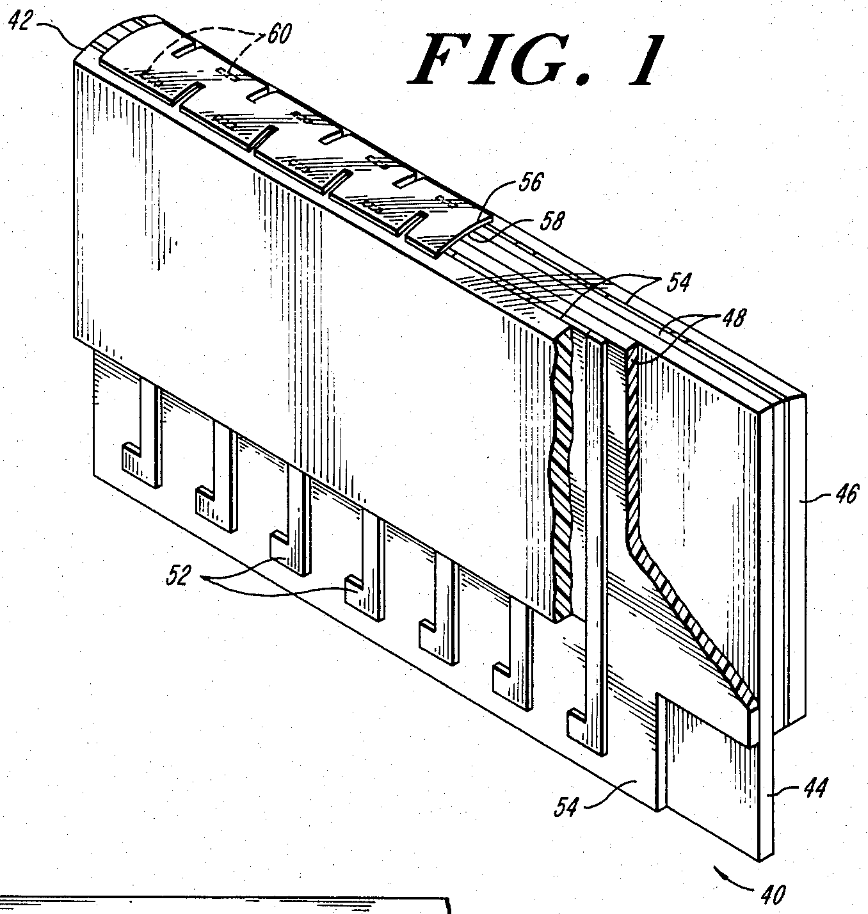
FIG. 1 is a cutaway pictorial view of a thermal print head constructed in accordance with the invention.
Figure 2:
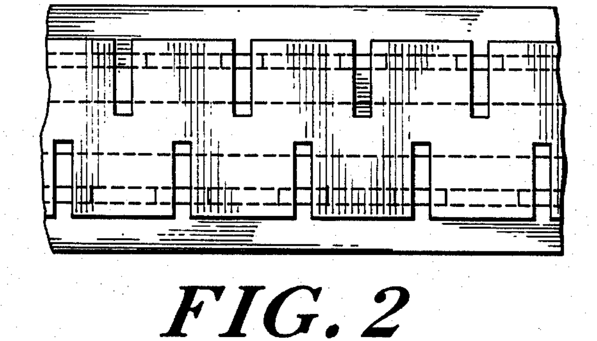
FIG. 2 is a cutaway top view illustrating the writing end of the embodiment of FIG. 1.

Referring to FIG. 1, there is shown a thermal print head 40 of laminated construction and having an edge 42 which serves as the print-head marking surface. A conductive ground sheet 44 is sandwiched on respective sides by respective dielectric sheets 48 on the outer surfaces of which electrodes 52 are provided, the electrodes having ends 60 coplanar with edge 42, and terminating at their opposite ends in contact pads 52. Outer dielectric sheets 46 sandwich and enclose the inner sheets. A layer 56 of resistive material is applied along edge 42 in electrical engagement with ends 60 of electrodes 52 and the confronting edge of ground sheet 44. Grooves 57 are provided in the resistive layer 56 between the adjacent electrodes 52 of each electrode array to provide partial electrical isolation of the printing elements. As illustrated in FIGS. 1 and 2, the two arrays of electrodes are laterally offset to provide enhanced printing resolution, and the separating grooves 57 are similarly offset to provide the offset array of printing elements defined by the active portions of the resistive layer.

The electrode contact pads 52 and ground sheet 44 are connected to a driving circuit by a suitable electrical connector, and the head is energized by applying power to one or more selected electrodes which cooperate with the ground plane and interposed portions of the resistive layer to provide an electrical path for heating of the then active portions of the resistive layer which serve as printing elements. The printing element heats sufficiently to thermally mark a thermally sensitive paper which is disposed and in engagement with the print edge 42 and usually moving relative thereto. The area of the print element is a function of the effective length and width of the end of the electrode 52, taking into account edge effects, the thickness of the effective area of the resistive material, and spacing between the electrode ends and ground plane.

Printing elements 52 are arrayed over the print head surface. In the illustrated embodiment, two rows of printing elements 62 are laterally offset from each other to provide for higher resolution marking on thermal paper as it moves over the print head. Arrangements with more than two rows are also possible by incorporating additional dielectric and conductive planar members into the laminated structure in a manner analogous to that described for the dual rows.

To make all planar members flush with each other, filler material 54 or adhesive patterning can be applied to the surfaces carrying the electrodes 52 so as to fill in the space required by the thickness of the electrodes. This may be accomplished by selective adhesive patterning or by conventional potting techniques. Alternatively, the electrodes may be recessed into the dielectric support. Thus when the structure is sandwiched, all opposing surfaces are flush with each other and no filler material is needed.

Figure 3:
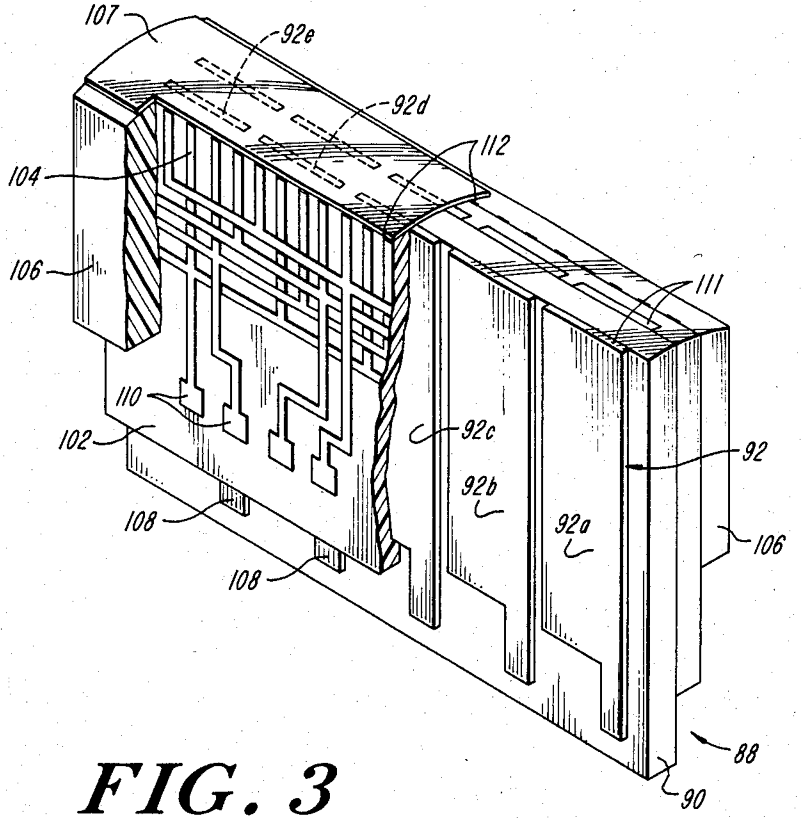
FIG. 3 is a cutaway pictorial view of an alternative embodiment of a print head according to the invention adapted for multiplex operation.
Figure 1:
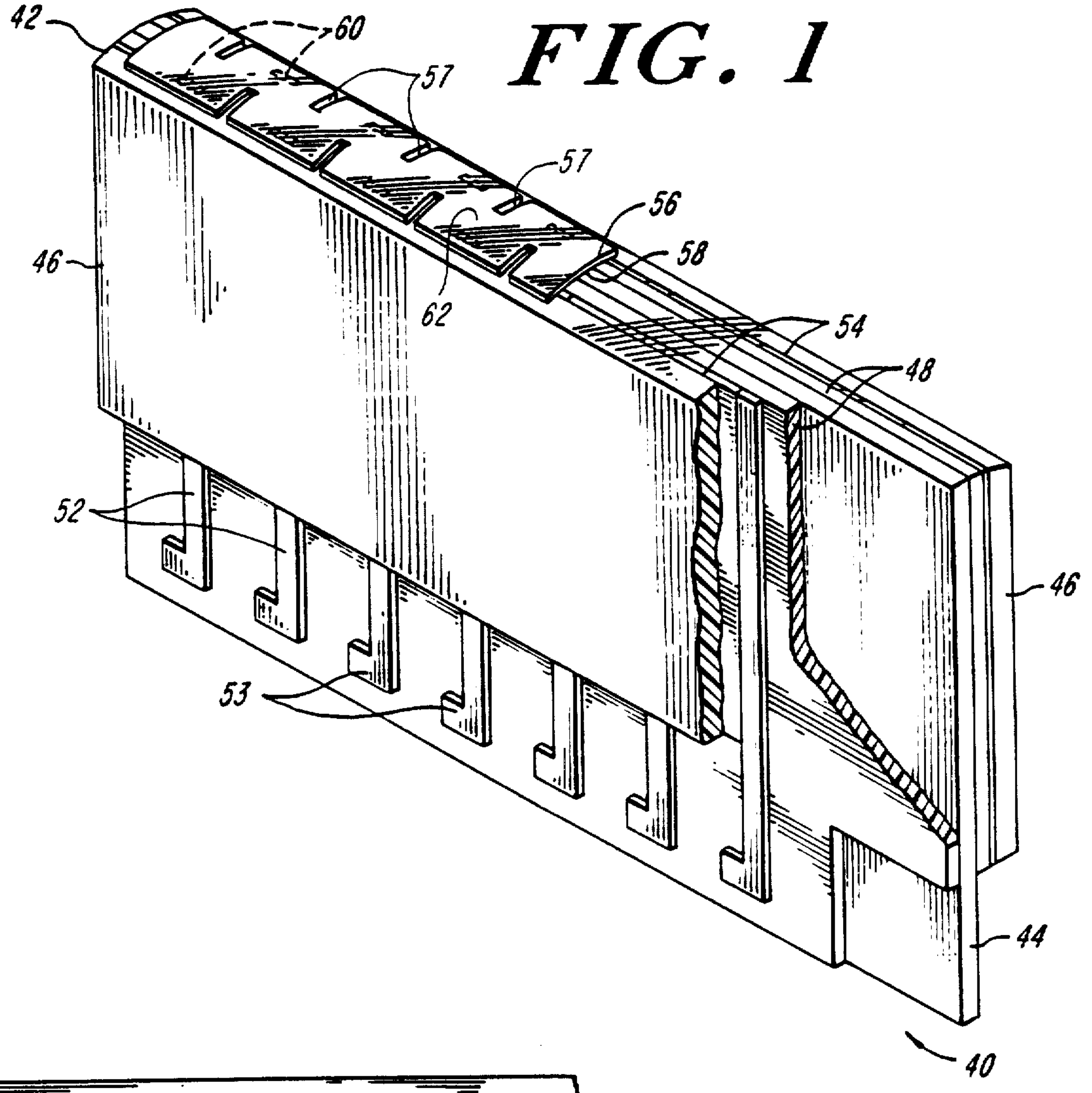
Figure 2:
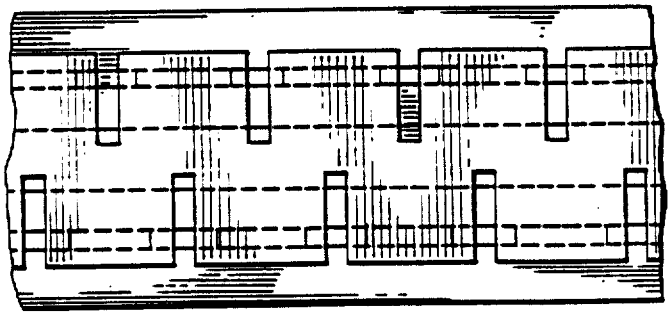
Figure 3:
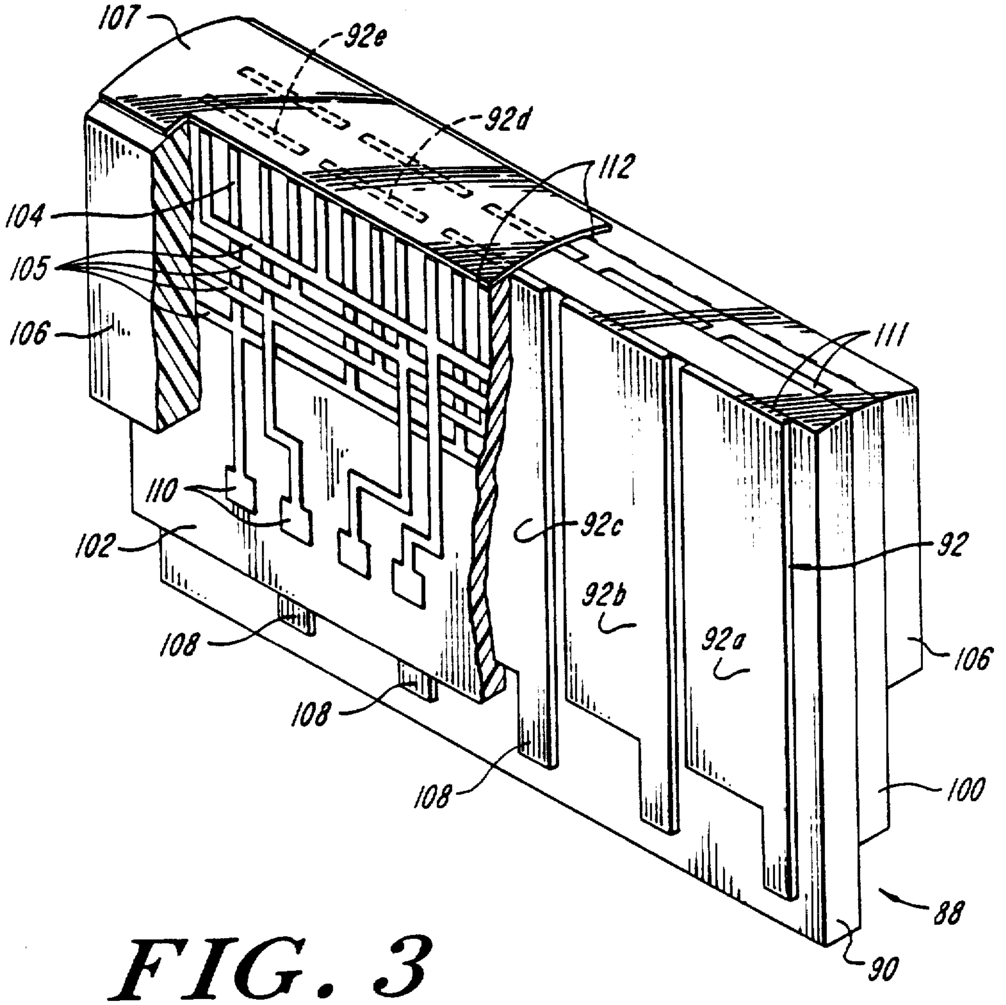

FIG. 3 shows a print head 88 suitable for multiplexed addressing operation. The laminated print head includes a central dielectric support 90 sandwiched on opposite surfaces by conductive ground planes 92 which are divided into electrically isolated segments 92*a*, 92*b*, 92*c*, etc. Circuit boards 100 sandwich ground planes 92 and each carry a network of electrodes 104 on their outer surfaces 102. Outer pieces 106 clamp the laminate structure on either side. Filler material or adhesive patterned as previously discussed creates flush opposing surfaces between the segmented ground plane 92 and the circuit boards 100, as well as between the circuit boards 100 and the end pieces 106. Resistive material 107 is adhered to the print head surface as previously discussed. The underside of resistive material 107 is in electrical contact with ground plane ends 111 and electrode ends 112.

Each segment of ground plane 92 includes a contact pad 108 for electrical connection to the associated ground plane segment. The electrodes 104 are arranged in groups on each circuit board 100 and are electrically interconnected by paths 105 to share contact pads 110. The paths 105 are insulated from the crossovers of electrodes 104. Each contact pad 110 is electrically connected to an electrode of each group of electrodes. Each group of electrodes is associated and confronts a respective ground plane segment 92*a*–92*e*. With a driving current applied to a contact pad 110 different printing elements can be energized depending on which of the ground plane segments is connected to complete the current path. Appropriate multiplex driving circuitry can be employed to selectively energize the head for intended printing operation. The electrode configuration is by way of example only, as other arrangements and interconnections of electrodes are contemplated to suit intended operational requirements.

Having above indicated several embodiments of the present invention, it will occur to those skilled in the art that modifications and alternatives can be practiced within the spirit of this invention. It is accordingly intended to define the scope of the invention only as indicated in the following claims.

What is claimed is:

1. A thermal print head comprising:

a first sheet of dielectric material, having front and rear surfaces and a top edge, and having a first plurality of electrodes on the front surface thereof, each electrode having an end terminating at said top edge of said first sheet, each electrode also having a contact area;

a conductive ground sheet having first and second surfaces, said first surface being in engagement with said rear surface of said first dielectric sheet, said conductive ground sheet also having an upper edge which is parallel to the top edge of said first sheet, both said top edge of said first sheet and said upper edge of said conductive ground sheet being in the same curved plane; and a layer of resistive material in electrical contact with said electrode ends and with said upper edge of said conductive ground sheet, sections of said layer serving as printing elements when electrically heated.

2. The invention of claim 1 further including:

a second sheet of dielectric material, having front and rear surfaces and a top edge, and having a second plurality of electrodes on the rear surface thereof, each electrode having an end terminating at said top edge of said second sheet, each electrode also having a contact area, the front surface of said second sheet being in engagement with said second surface of said conductive ground sheet such that the top edge of said second sheet is parallel to said upper edge of said conductive ground sheet and the top edges of said first and second sheets as well as the upper edge of said conductive ground sheet are in the same curved plane;

the resistive material being in electrical contact with the upper edge of the conductive ground sheet and with the ends of the first and second pluralities of electrodes.

3. A thermal print head comprising:

a first sheet of dielectric material, having front and rear surfaces and a top edge, and having a first plurality of electrodes on the front surface thereof, each electrode having an end terminating at said top edge of said first sheet, said electrodes defining an array of spaced electrode ends along the top edge of the sheet;

said array of electrode ends being arranged in groups, each of the respective electrodes of one group being electrically connected to a corresponding respective electrode of each other group and electrically connected to a contact pad on the front surface of said first sheet;

a plurality of conductive ground sheets disposed in engagement with the rear surface of said first sheet, each ground sheet having an upper edge terminating at said top edge of the first sheet, each ground sheet also having its contiguous upper edge in alignment with a group of electrode ends; and an electrically resistive material disposed along the contiguous edges of the dielectric first sheet and ground sheets and in electrical contact with the upper edges of the ground sheets and the top ends of the electrodes.

4. The invention of claim 3, further including:

a second sheet of dielectric material having front and rear surfaces and a top edge, and having a second plurality of electrodes on said rear surface thereof, each electrode having an end terminating at said top edge of said second sheet, said electrodes defining an array of spaced electrode ends along the top edge of the sheet;

said array of electrode ends being arranged in groups, each of the respective electrodes of one group being electrically connected to a corresponding respective electrode of each other group and electrically connected to a contact pad on the rear surface of said second sheet;

a plurality of conductive ground sheets disposed in engagement with the front surface of said second sheet, each ground sheet having an upper edge terminating at said top edge of the second sheet, each ground sheet having its contiguous upper edge in alignment with a group of electrode ends; and the resistive material being in contact with the upper edge of the conductive ground sheets and with the contiguous ends of the first and second arrays of electrodes.

5. A thermal print head comprising:

a plurality of electrodes disposed on one surface of a sheet of dielectric material and having ends terminating along a common edge of the sheet;

a conductive ground sheet disposed in association with the surface of the dielectric sheet opposite the electrodes and having an upper edge which terminates at the edge of the dielectric sheet along which the electrode ends are disposed;

a layer of resistive material in electrical contact with said electrode ends and with the upper edge of said conductive ground sheet; and means by which electrical power can be applied to the ground plane and electrodes.

6. The print head of claim 1 wherein the layer of resistive material is slotted between adjacent electrode ends.

* * * * *

UNITED STATES PATENT AND TRADEMARK OFFICE

CERTIFICATE OF CORRECTION

PATENT NO. : 4,636,811 Page 1 of 3

DATED : January 13, 1987

INVENTOR(S) : Joseph J. Bakewell

It is certified that error appears in the above-identified patent and that said Letters Patent is hereby corrected as shown below:

IN THE DRAWINGS

Fig. 1, Reference numerals 46, 57, 62 and 53 are missing (See attached drawings)

Fig. 3, Reference numerals 105, 108, and 100 are missing (See attached drawings)

Column 2, line 16, "contact pads 52." should read --contact pads 53.-- line 30, "contact pads 52" should read --contact pads 53-- line 40, "print edge 42" should read --print head edge 42-- line 46, "elements 52" should read --elements 62--

Signed and Sealed this

Thirteenth Day of December, 1988

Attest:

DONALD J. QUIGG

Attesting Officer

Commissioner of Patents and Trademarks